F. B. ALLEN.
CLUTCH MECHANISM.
APPLICATION FILED MAY 15, 1911.
1,030,373.
Patented June 25, 1912.
4 SHEETS—SHEET 1.
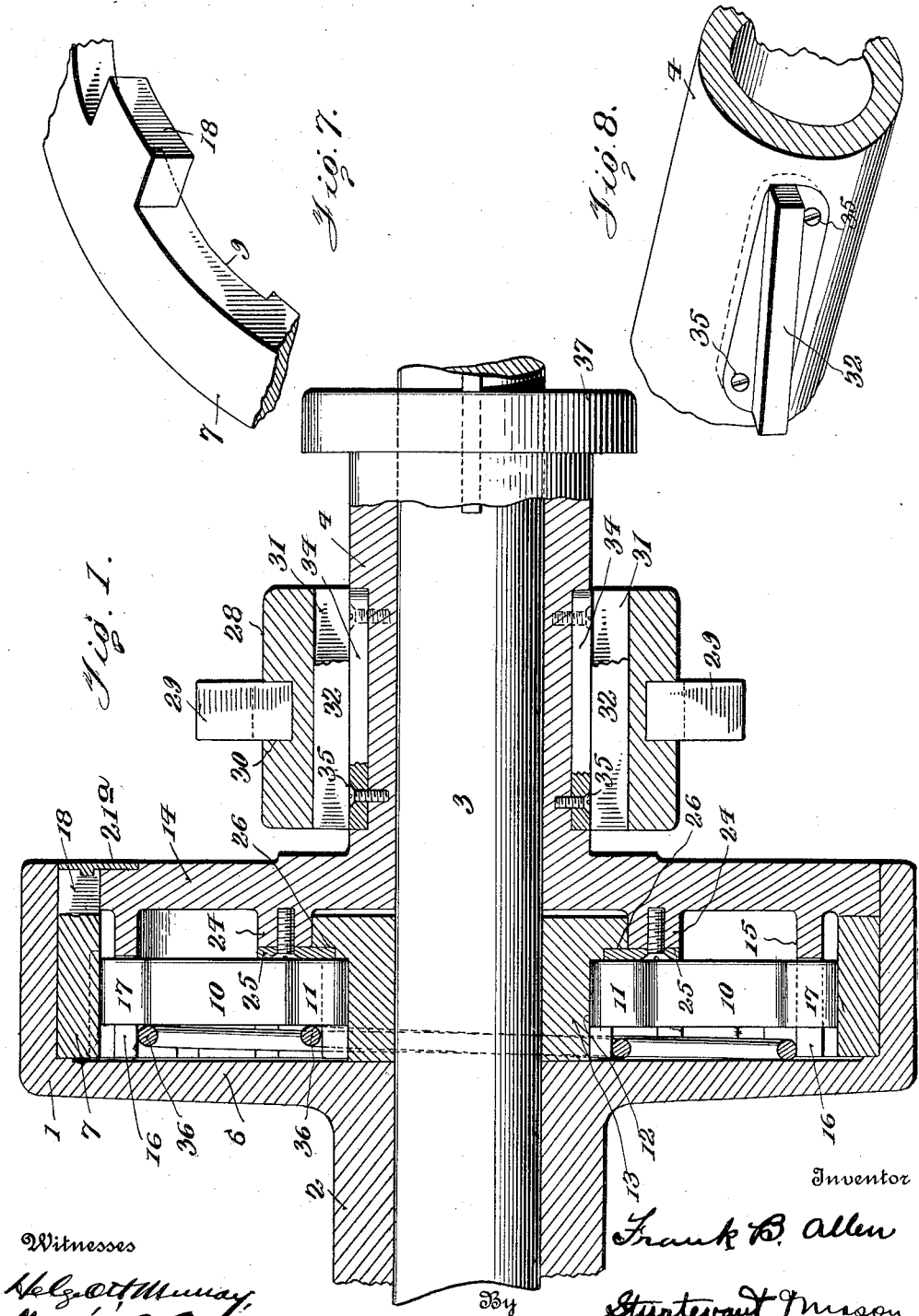
Witnesses
Inventor
Frank B. Allen
By Sturtevant & Mason
Attorney

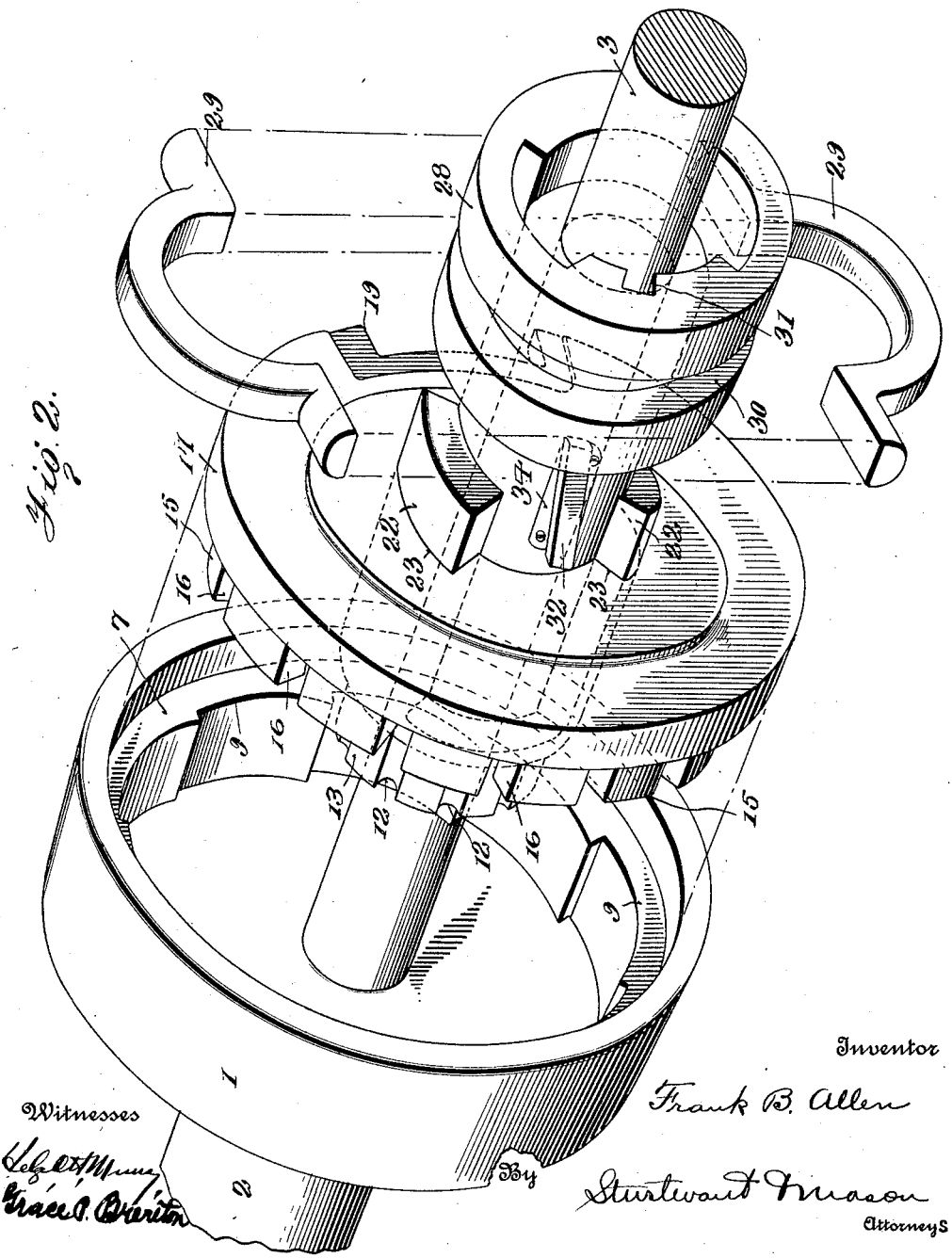

F. B. ALLEN.
CLUTCH MECHANISM.
APPLICATION FILED MAY 15, 1911.
1,030,373.
Patented June 25, 1912.
4 SHEETS—SHEET 3.
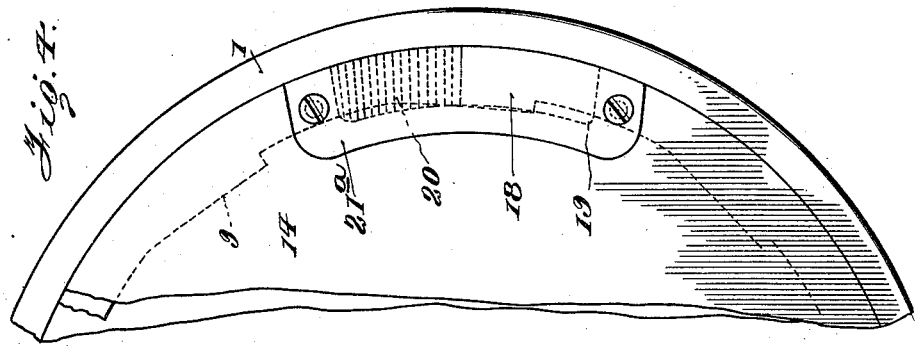
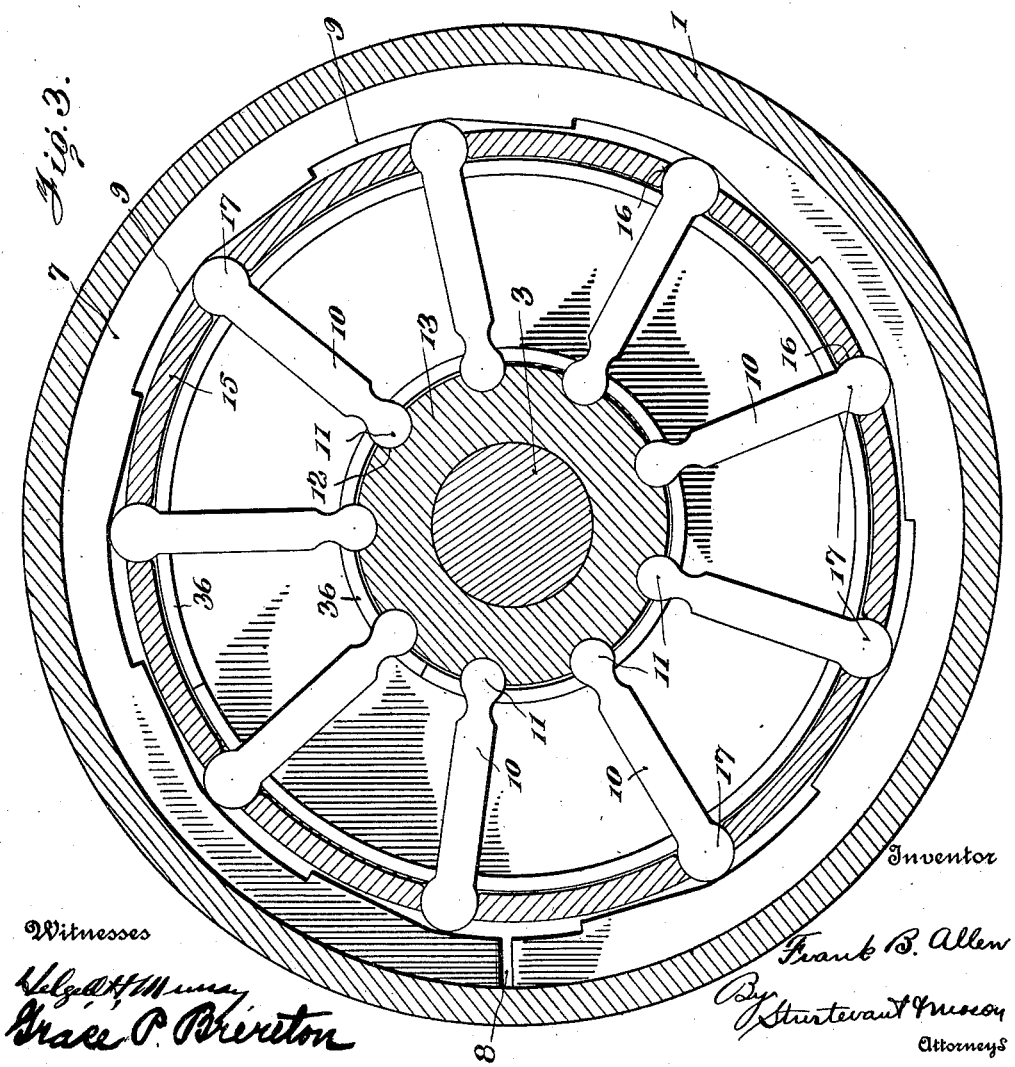

F. B. ALLEN.
CLUTCH MECHANISM.
APPLICATION FILED MAY 15, 1911.

1,030,373.

Patented June 25, 1912.
4 SHEETS—SHEET 4.

Witnesses

Inventor
Frank B. Allen
By Sturtevant & Mason
Attorneys

UNITED STATES PATENT OFFICE.

FRANK B. ALLEN, OF SALT LAKE CITY, UTAH.

CLUTCH MECHANISM.

1,030,373.  Specification of Letters Patent.  Patented June 25, 1912.

Application filed May 15, 1911. Serial No. 627,354.

*To all whom it may concern:*

Be it known that I, FRANK B. ALLEN, a citizen of the United States, residing at Salt Lake City, in the county of Salt Lake, State of Utah, have invented certain new and useful Improvements in Clutch Mechanism, of which the following is a description, reference being had to the accompanying drawing and to the letters and figures of reference marked thereon.

The invention relates to new and useful improvements in clutch mechanisms, and more especially to devices of this character wherein a friction ring is used for transmitting power from the driving to the driven member.

An object of the invention is to provide a clutch mechanism wherein the friction ring is moved into clamping engagement with a transmitting ring by a plurality of toggle members closely spaced, so as to bring about a firm gripping contact between the friction parts.

A further object of the invention is to provide means for adjusting the gripping contact between the frictional parts.

These and other objects will in part be obvious, and will in part be hereinafter more fully described.

Figure 5:
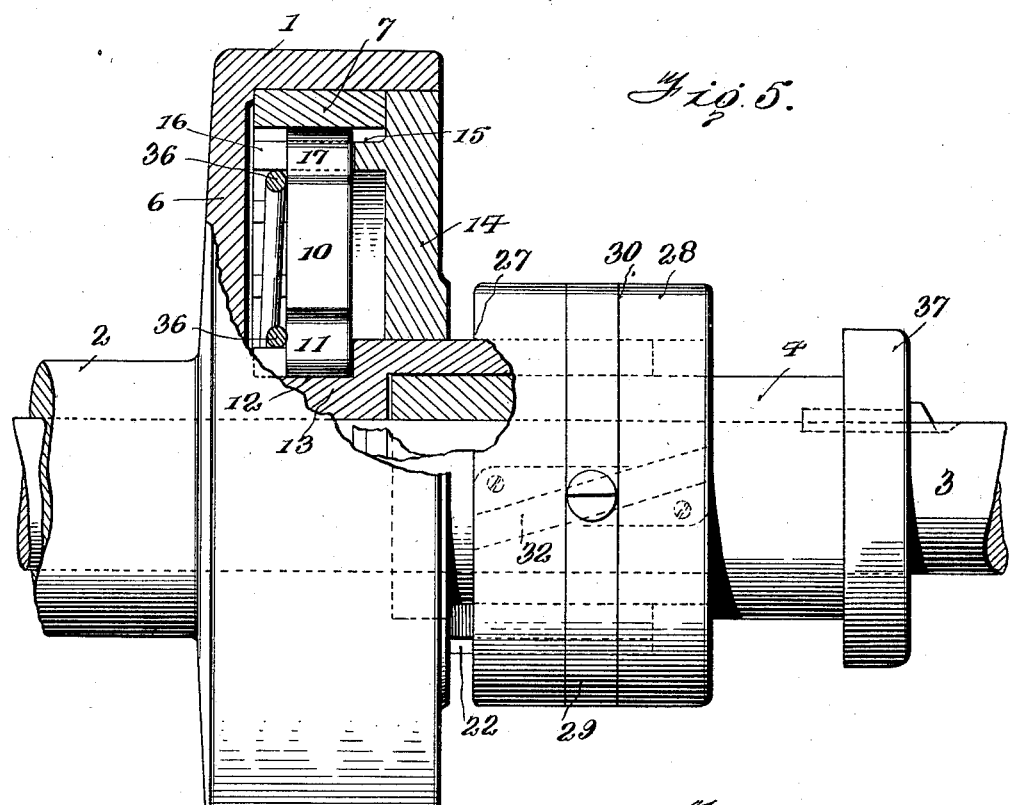
Figure 6:
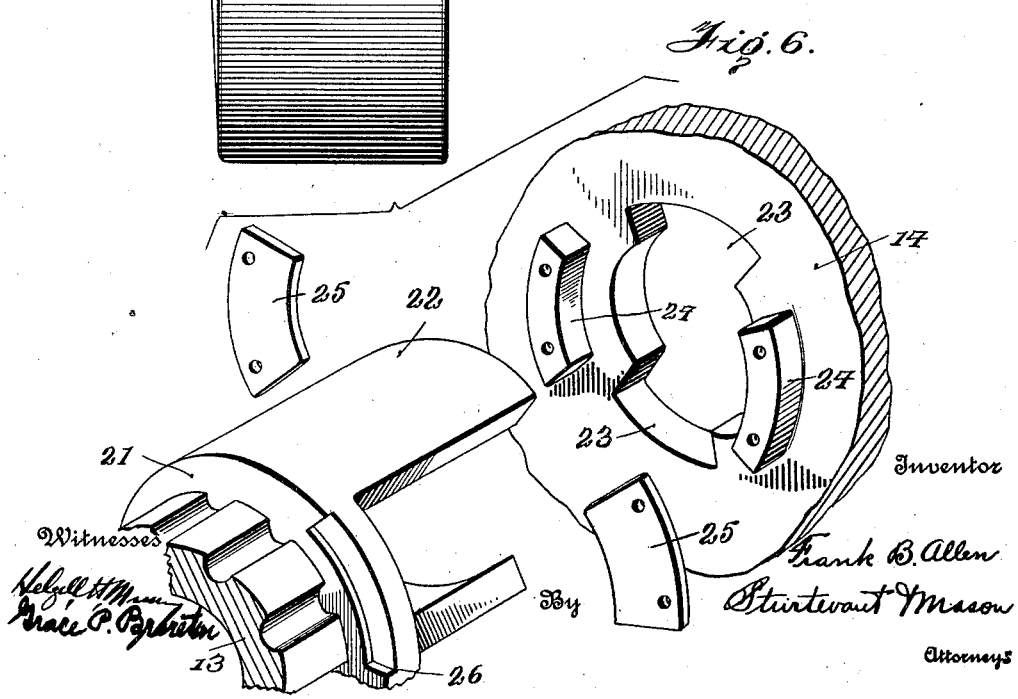

In the drawings which show by way of illustration one embodiment of the invention,—Figure 1 is a sectional view through a clutch mechanism embodying my improvements; Fig. 2 is a separated perspective view, showing the various parts of the clutch mechanism; Fig. 3 is a sectional view through the transmission ring and the operating hub, showing the frictional gripping ring and the toggle members in side elevation; Fig. 4 is a detail view, showing in side elevation the devices for adjusting the position of the gripping ring; Fig. 5 is a plan view partly in section of the parts shown in Fig. 1; Fig. 6 is a separated perspective view, showing the hub, the operating plate and the parts for holding the same together; Fig. 7 is a detail perspective view showing a portion of the gripping ring and the lug for holding the same in position; and Fig. 8 is a detail perspective view showing the manner of mounting the rib for rotating the operating sleeve.

In carrying out my invention, a transmission ring 1 may have a gear applied directly thereto for receiving or transmitting power, or the same may be attached to a sleeve 2, which in turn is connected to any suitable devices for receiving power, or to which power may be transmitted. As herein shown, the sleeve 2 is freely mounted on the shaft 3. This shaft 3 is preferably keyed to a sleeve 4, so that the shaft 3 may be either the driving or driven member, and the transmission ring 1 may be either the driven or driving member. The transmission ring 1 is carried at the outer periphery of a supporting plate 6, and extends laterally therefrom.

Housed within the overhanging transmission ring 1 are the clutching parts for locking the sleeve 4 to the transmission ring. These locking parts consist of a gripping ring 7, which is split so as to provide spaced ends 8, see Fig. 3. The inner face of the gripping ring 7 is formed with a plurality of cam faces 9. Coöperating with each cam face 9 is a toggle lever 10. This toggle lever at its inner end is formed with a cylindrical head 11, which fits within a suitable socket 12, formed in the hub 13 freely mounted on the shaft 3.

A plate 14 similar to the plate 6, is, as herein shown, formed integral with the sleeve 4. This plate 14 fits within the transmission ring 1, and carries an inwardly projecting flange 15. This flange 15 is slotted at 16 to receive the outer end of the toggle levers 10. Each toggle lever extends through a slot 16. The outer ends of the toggle levers 10 are formed with cylindrical parts 17, which bear against the cam surfaces 9 of the gripping ring 7. When the parts are in the position shown in Fig. 3, the toggle levers 10 are of such length that in this radial position the gripping ring 7 is forced against the transmission ring 1, so that said gripping ring and transmission ring are locked together. It will readily be seen that if the hub 13 is turned relative to a flange 15, so as to position said toggle levers at an angle to the radius of the transmission ring, that said toggle levers will be withdrawn from the cam faces 9, and said gripping ring 7 when properly constructed will move away from the transmission ring 1, and release the same. This gripping ring 7 is preferably a steel ring, so shaped as to release the transmission ring when released from the toggle levers 10.

The gripping ring 7 is formed with an outwardly projecting lug 18. This lug 18 is adapted to lie in a recess 19, see Figs. 2 and 3, formed in the plate 14 attached to the sleeve 4. This lug forms a connection, therefore, between the gripping ring 7, and the sleeve 4, so that when the gripping ring 7 is locked by the transmission ring 1, the sleeve 4 will be locked to the transmission ring 1. The cam faces 9 on the gripping ring are formed concentrically to the center of the supporting shaft. It will readily be seen that by adjusting the gripping ring 7, the pressure of the gripping ring against the transmission ring upon the operation of the toggle levers will be varied. The lug 18 only fills a portion of the recess 19 in the plate 14. Short plates 20 may be placed in the recess 19 to fill up the remainder of the same, see Fig. 4, and a cover plate 21ᵃ may be provided for holding the plates in proper position. By taking out some of the plates 20 and moving the lug 18 so that the plates may be placed again in the recess on the opposite side of the lug 18, I am able to adjust the position of the gripping ring 7 relative to the plate 14, and thereby vary the frictional contact between said gripping ring and said transmission ring.

As a means for moving the toggle levers from a radial position to an inclined position, or vice versa, I have provided means for rotating the hub 13 relative to the plate 14, and the slotted flange 15 carried thereby. The hub 13, see Fig. 6, is formed with an enlarged portion 21, which carries projecting members 22 that extend longitudinally of the shaft. The plate 14 is formed with openings 23 through which the projecting members 22 are adapted to pass. The slot 23 is considerably wider than the projecting members 22, so that said projecting members, together with the hub, may be rotated to a slight extent relative to the plate 14. The plate 14 also carries segmental lugs 24, which are so spaced as to extend over the enlarged part 21 and plates 25 are adapted to be screwed to the lugs 24, and to seat in pockets 26 in the enlarged part 21 of the hub 13. These pockets 26 are made sufficiently wide so as to allow the plates 25 to have a relative movement circumferentially about the shaft therein, so that the plates while holding the parts 7, will not prevent a positive rotation of the parts connected thereby. These plates 25 serve to hold the parts together, and aid in the assembling of the clutch mechanism.

The projecting members 22 which fit in slots 27 formed on the inner face of a sleeve 28, are freely mounted on the sleeve 4. A rotation of the sleeve 28 relative to the sleeve 4 will, therefore, cause a rotation of the hub 13, relative to the plate 4, and the projecting flange carried thereby. The sleeve 28 slides freely longitudinally of the projecting members 22. Yoke parts 29 are adapted to engage a groove 30 in the sleeve 28, for the purpose of sliding the same on the sleeve 4 longitudinally of the projecting members 22. These yoke members 29 allow the sleeve 28 to rotate freely therein.

A spiral groove 31 is formed in the shifting sleeve 28, and this sleeve is adapted to engage a rib 32, which is mounted on a base piece 34 secured in a recess in the sleeve 4 by suitable screws 35. It will readily be seen that a sliding of the sleeve 28 to the right, as viewed in Fig. 5, will cause said sleeve to rotate about the sleeve 4, and in turn rotate the hub 13. A sliding of the sleeve 28 in the opposite direction will rotate the hub in the opposite direction.

In order to hold the toggle levers in place and centrally positioned between the plates 6 and 14, the right hand faces of said toggle levers are adapted to engage the enlarged portion 21 of the hub at the inner ends thereof, and the bottom of the slots 16 at their outer ends. Springs 36 bear against the other sides of the clutch members and against the plate 6.

In the assembling of the parts, the hub 13 is placed against the plate 14, with the members 22 projecting through the openings 23. The hub is held to the plate 14 by the locking plates 25, which are connected to the lugs 24. The clutch levers 10, are then placed in the respective sockets in the hub 13, and the slots in the flange 15. The gripping ring 7 may be placed about the ends of the clutch levers 10. The springs 36 are put in place, and the assembled parts connected to the plate 14 are inserted within the transmission ring 1. The shifting sleeve 28 is placed on the sleeve 4 and in engagement with the projecting members 22, and also the operating spiral rib 32. A collar 37 on the end of the sleeve 4 will limit the movement of the shifting sleeve 28 in one direction. The yoke members 29 are adapted to move the sleeve 28 back and forth longitudinally of the sleeve 4, and through the rotating of the hub 13, cause the gripping ring 7 to either engage or disengage the transmission ring 1.

It is obvious that minor changes in the details of construction may be made, without departing from the spirit of my invention as set forth in the appended claims.

Having thus described my invention, what I claim as new and desire to secure by Letters Patent, is:—

1. A clutch mechanism including in combination, a transmission ring, a split gripping ring located within the same and having cam faces, a hub, means for rotating the hub relative to the transmission ring, a plurality of toggle levers intermediate said hub and said gripping ring and adapted to engage cam faces on said gripping ring and means for supporting said toggle levers intermediate the ends thereof.

2. A clutch mechanism including in combination, a transmission ring, a split gripping ring located within the same and having cam faces, a hub, means for rotating the hub relative to the transmission ring, a plurality of toggle levers intermediate said hub and said gripping ring and adapted to engage cam faces on said gripping ring and means for supporting said toggle levers intermediate the ends thereof and means for varying the position of the gripping ring relative to the hub whereby the frictional contact between the gripping ring and transmission ring may be varied.

3. A clutch mechanism including in combination, a transmission ring, a split gripping ring located within the same and having cam faces, a hub, a sleeve, a plate carried by said sleeve and connected with said gripping ring, means for rotating the hub relative to the plate, toggle levers engaging said hub and said gripping ring for forcing the gripping ring into contact with the transmission ring and means for supporting said toggle levers intermediate the ends thereof.

4. A clutch mechanism including in combination, a transmission ring, a split gripping ring located within the same, a hub, a sleeve, a plate carried by said sleeve and connected with said gripping ring, means for rotating the hub relative to the plate, toggle levers engaging said hub and said gripping ring and forcing the gripping ring into contact with the transmission ring, and means for adjusting the position of the gripping ring relative to said plate.

5. A clutch mechanism including in combination, a transmission ring, a gripping ring located within the same, a hub having recesses formed in its outer face, a plate having an inwardly projecting flange formed with slots corresponding to the recesses in said hub, toggle levers mounted at one end in said recesses in the hub, and at the other ends in the slots in said flange, the outer ends of said toggle levers engaging said gripping ring, and means for rotating said hub relative to said plate.

6. A clutch mechanism including in combination, a transmission ring, a gripping ring located within the same, a hub having recesses formed in its outer face, a plate having an inwardly projecting flange formed with slots corresponding to the recesses in said hub, toggle levers mounted at one end in said recesses in the hub, and at the other end in the slots in said flange, the outer ends of said toggle levers engaging said gripping ring, means for rotating said hub relative to said plate, a sleeve connected to said plate, a shifting sleeve carried by said first named sleeve and having a spiral groove formed therein, and a spiral rib for engaging said spiral groove for rotating the shifting sleeve, said hub having projecting members extending through openings in the plate and engaging slots in said shifting sleeve, whereby the shifting of the sleeve will rotate said hub.

7. A clutch mechanism including in combination, a transmission ring, a gripping ring within said transmission ring, a sleeve, a plate carried by said sleeve, a flange mounted on said plate having slots formed therein, said plate having a recess, a lug mounted on said gripping ring and extending into said recess, means whereby the position of the lug in the recess may be adjusted, a hub having recesses formed in its outer face corresponding to the slots in said flange, toggle levers mounted at one end in the recesses in said hub, and extending through the slots in the flange at their other ends and into contact with said gripping ring, and means for rotating said hub relative to said plate.

8. A clutch mechanism including in combination, a transmission ring, a gripping ring within said transmission ring, a sleeve, a plate carried by said sleeve, a flange mounted on said plate having slots formed therein, said plate having a recess, a lug mounted on said gripping ring and extending into said recess, means whereby the position of the lug in the recess may be adjusted, a hub having recesses formed in its outer face corresponding to the slots in said flange, toggle levers mounted at one end in the recesses in said hub, and extending through the slots in the flange at their other ends and into contact with said gripping ring, and means for rotating said hub relative to said plate, said gripping ring having cam faces coöperating with said toggle levers, whereby the adjustment of the gripping ring will vary the gripping contact between said ring and the transmission ring.

9. A clutch mechanism including in combination, a transmission ring, a gripping ring within said transmission ring, a sleeve, a plate carried by said sleeve, a flange mounted on said plate having slots formed therein, said plate having a recess, a lug mounted on said gripping ring and extending into said recess, means whereby the position of the lug in the recess may be adjusted, a hub having recesses formed in its outer face corresponding to the slots in said flange, toggle levers mounted at one end in the recesses in said hub, and extending through the slots in the flange at their other ends and into contact with said gripping ring, means for rotating said hub relative to said plate, said gripping ring having cam faces coöperating with said toggle levers, whereby the adjustment of the gripping ring will vary the gripping contact between said ring and the transmission ring, and springs located within the transmission ring for holding said toggle levers in proper position relative to the gripping ring and operating hub.

In testimony whereof I affix my signature, in presence of two witnesses.

FRANK B. ALLEN.

Witnesses:
GEO. F. GOODWIN,
WALTER W. LITTLE.